(12) United States Patent
Ohara et al.

(10) Patent No.: US 11,895,230 B2
(45) Date of Patent: Feb. 6, 2024

(54) INFORMATION PROCESSING APPARATUS, SECURE COMPUTATION METHOD, AND PROGRAM

(71) Applicant: NEC Corporation, Tokyo (JP)

(72) Inventors: Kazuma Ohara, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 379 days.

(21) Appl. No.: 17/424,110

(22) PCT Filed: Jan. 24, 2019

(86) PCT No.: PCT/JP2019/002318
§ 371 (c)(1),
(2) Date: Jul. 19, 2021

(87) PCT Pub. No.: WO2020/152831
PCT Pub. Date: Jul. 30, 2020

(65) Prior Publication Data
US 2022/0069980 A1   Mar. 3, 2022

(51) Int. Cl.
*H04L 9/08* (2006.01)
*G06F 7/48* (2006.01)
(Continued)

(52) U.S. Cl.
CPC ............ *H04L 9/085* (2013.01); *G06F 7/4812* (2013.01); *G06F 7/556* (2013.01); *H04L 9/0618* (2013.01); *H04L 9/0869* (2013.01)

(58) Field of Classification Search
CPC ..... H04L 9/085; H04L 9/0869; H04L 9/0618; G06F 7/4812; G06F 7/556
See application file for complete search history.

(56) References Cited

U.S. PATENT DOCUMENTS 8,311,212 B2 * 11/2012 Giraud .................. H04L 9/3247
    713/188
8,369,519 B2 *  2/2013 Liardet .................. G06F 7/723
    380/30
(Continued)

FOREIGN PATENT DOCUMENTS

JP          H076025 A    1/1995
JP          H10222065 A  8/1998
(Continued)

OTHER PUBLICATIONS

International Search Report for PCT Application No. PCT/JP2019/002318, dated Apr. 23, 2019.
(Continued)

*Primary Examiner* — Viral S Lakhia
(74) *Attorney, Agent, or Firm* — Sughrue Mion, PLLC

(57) ABSTRACT

An information processing apparatus comprises a partial modular exponentiation calculating part and a partial modular exponentiation synthesizing part. The partial modular exponentiation calculating part is given a base in plaintext and a modulo in plaintext and shared exponents and calculates a partial modular exponentiation that equals a set of shared values according to a modular exponentiation of the base raised by the shared exponent. The partial modular exponentiation synthesizing part calculates shared values of the modular exponentiation from the partial modular exponentiation that equals shared values relating to the modular exponentiation of a sum of shared exponents.

17 Claims, 8 Drawing Sheets

(51) Int. Cl.
*H04L 9/06* (2006.01)
*G06F 7/556* (2006.01)

(56) References Cited

U.S. PATENT DOCUMENTS

| | | | | |
|---|---|---|---|---|
| 8,600,047 | B2* | 12/2013 | Michiels | G06F 7/723 380/28 |
| 8,984,040 | B2* | 3/2015 | Joye | G06F 7/724 708/491 |
| 10,423,807 | B2* | 9/2019 | Jaffe | H04L 9/003 |
| 10,715,508 | B2* | 7/2020 | Hibshoosh | H04L 9/008 |
| 10,826,679 | B2* | 11/2020 | Jablonski | G06F 7/723 |
| 10,841,784 | B2* | 11/2020 | Wang | H04W 12/04 |
| 2009/0041239 | A1 | 2/2009 | Teranishi | |
| 2017/0061833 | A1* | 3/2017 | Joye | H04L 9/3073 |
| 2018/0048625 | A1 | 2/2018 | Teranishi | |

FOREIGN PATENT DOCUMENTS

| | | | |
|---|---|---|---|
| JP | 2004004341 | A | 1/2004 |
| JP | 2006-352254 | A | 12/2006 |
| JP | 2006330462 | A | 12/2006 |
| WO | 2016148281 | A1 | 9/2016 |
| WO | 2018135511 | A1 | 7/2018 |
| WO | 2018135566 | A1 | 7/2018 |

OTHER PUBLICATIONS

Ikarashi et al., "Secure Database Operations Using an Improved 3-party Verifiable Secure Function Evaluation", The Institute of Electronics, Information and Communication Engineers, the 2011 Symposium on Cryptography and Information Security Kokura, Japan, Jan. 25-28, 2011, pp. 1-8.

Ikarashi et al., "O(I) Bits Communication Bit Decomposition and O(|p'|) Bits Communication Modulus Conversion for Small k Secret-Sharing-Based Secure Computation", Computer Security Symposium 2013, Oct. 21-23, 2013, pp. 785-792.

Araki et al., "High-Throughput Semi-Honest Secure Three-Party Computation with an Honest Majority", CCS '16: Proceedings of the 2016 ACM SIGSAC Conference on Computer and Communications Security, Oct. 2016, pp. 805-817.

Araki et al., "Generalizing the SPDZ Compiler for Other Protocols", the 2018 ACM SIGSAC Conference, Oct. 2, 2018, pp. 1-33.

Ning et al., "Constant-Rounds, Linear Multi-party Computation for Exponentiation and Modulo Reduction with Perfect Security", International Conference on the Theory and Application of Cryptology and Information Security, ASIACRYPT 2011, Advances in Cryptology—ASIACRYPT 2011, pp. 572-589.

Japanese Office Action for JP Application No. 2020-567320 dated Jun. 28, 2022 with English Translation.

* cited by examiner

INFORMATION PROCESSING APPARATUS, SECURE COMPUTATION METHOD, AND PROGRAM

This application is a National Stage Entry of PCT/JP2019/002318 filed on Jan. 24, 2019, the contents of all of which are incorporated herein by reference, in their entirety.

TECHNICAL FIELD

The present invention relates to an information processing apparatus, secure computation method, and program. More specifically, it relates to a method for calculating output of a given function by having a plurality of apparatuses calculate it while communicating with each other where none of these apparatuses can obtain information about the input to or output from the function unless they mutually share the data they handle with each other among a sufficient number of a plurality of apparatuses.

BACKGROUND

The secure computation method is a technology that can keep the computation process and its results secret from the relevant entities. By sharing and storing data on the plurality of servers managed by a third party such as cloud, any calculation can be performed on the data. Since the data, calculation process, and calculation results are not known to the third party, it can be used to outsource the analysis process for sensitive information such as personal information.

NPL 1 discloses generating random number for use in secure computations. NPL 2 discloses a technology referred to as "Bit Decomposition". The details of "Bit Decomposition" will be described later. NPL 3 discloses a PRG (pseudo-random number generator) that uses an input with a key and an index to output an n-bit numerical sequence. NPL 4 discloses technology referred to as "Bit Injection". The details of "Bit Injection" will be described later.

[NPL 1] Secure Database Operations Using An Improved 3-party Verifiable Secure Function Evaluation, D. Ikarashi, K. Chida, K. Hamada, K. Takahashi, SCIS2011

[NPL 2] O(l) Bits Communication Bit Decomposition and O(|p'|) Bits Communication Modulus Conversion for Small k Secret-Sharing-Based Secure Computation, D. Ikarashi, K. Hamada, R. Kikuchi, K. Chida, CSS2013

[NPL 3] High-Throughput Semi-Honest Secure Three-Party Computation with an Honest Majority, Toshinori Araki, Jun Furukawa, Yehuda Lindell, Ariel Nof, Kazuma Ohara

[NPL 4] Generalizing the SPDZ Compiler For Other Protocols, Toshinori Araki, Assi Barak, Jun Furukawa, Marcel Keller, Yehuda Lindell, Kazuma Ohara, Hikaru Tsuchida

SUMMARY

Each of the disclosures in the above citation list shall be incorporated in this document by reference thereto. The following analysis is given by present inventors.

Here, modular exponentiation is a process of calculating x^a mod p with certain values x, a, and a modulus p as input. Here, x is the base of the modular exponentiation and a is the exponent.

In the secure computation of the modular exponentiation, three possible patterns may be considered:

(1) Keep x secret
(2) Keep a secret
(3) Keep both x and a secret

The present disclosure relates in particular to (2), calculating x^a mod p while keeping exponent a in secret.

A modular exponentiation is one of the most frequently used process, mainly in cryptographic elemental techniques. In this case, the exponent of the modular exponentiation is often treated as a value that should be kept secret in cryptography. If we can perform modular exponentiation in secure computation, we can realize cryptographic process in a distributed system. As an example, it is possible to compute digital signature while protecting the secret key on distributed nodes and an application in the protection of secret key on the distributed nodes such as blockchains may be considered. Since the known method of modular exponentiation calculating is realized by combination of numerical and logical operations, this can be achieved in the secure computation by using bit decomposition etc. as abovementioned. However, the communication amount and number of communications are still large, therefore more efficient protocols are required.

It is a main object of the present invention to provide an information processing apparatus, secure computation method, and program which enable to contribute to reducing amount and numbers of communication for achieving modular exponentiation secure computation.

According to a first aspect of the present invention, provided is an information processing apparatus comprising: a partial modular exponentiation calculating part that is given a base in plaintext and a modulo in plaintext and shared exponents and calculates a set of shared values relating to modular exponentiation of the shared exponents in plaintext as a partial modular exponentiation, and a partial modular exponentiation synthesizing part that calculates shared values relating to modular exponentiation of a sum of the shared exponents in plaintext from the partial modular exponentiation.

According to a second aspect of the present invention, provided is a secure computation method, comprising: a step of calculating, given a base in plaintext and a modulo in plaintext and shared exponents, a set of shared values relating to modular exponentiation of the shared exponents in plaintext as a partial modular exponentiation, and a step of calculating shared values relating to modular exponentiation of a sum of the shared exponents in plaintext as the shared values of modular exponentiation.

According to a third aspect of the present invention, provided is a program for causing a computer to perform: a process that is given a base in plaintext and a modulo in plaintext and shared exponents and calculates a set of shared values relating to modular exponentiation of the shared exponents of an input plaintext as a partial modular exponentiation, and a process that calculates shared values relating to modular exponentiation of a sum of the shared exponents of the plaintext as the shared values of exponentiation.

The program can be stored on a computer-readable storage medium. The storage medium can be non-transient, such as semiconductor memory, hard disk, magnetic recording medium, optical recording medium, and the like. The present invention can also be implemented as a computer program product.

According to aspects of the invention and the disclosure, there is provided an information processing apparatus, secure computation method, and program which enable to contributes to reducing amount and numbers of communication for achieving modular exponentiation secure computation.

PREFERRED MODES

Figure 1:
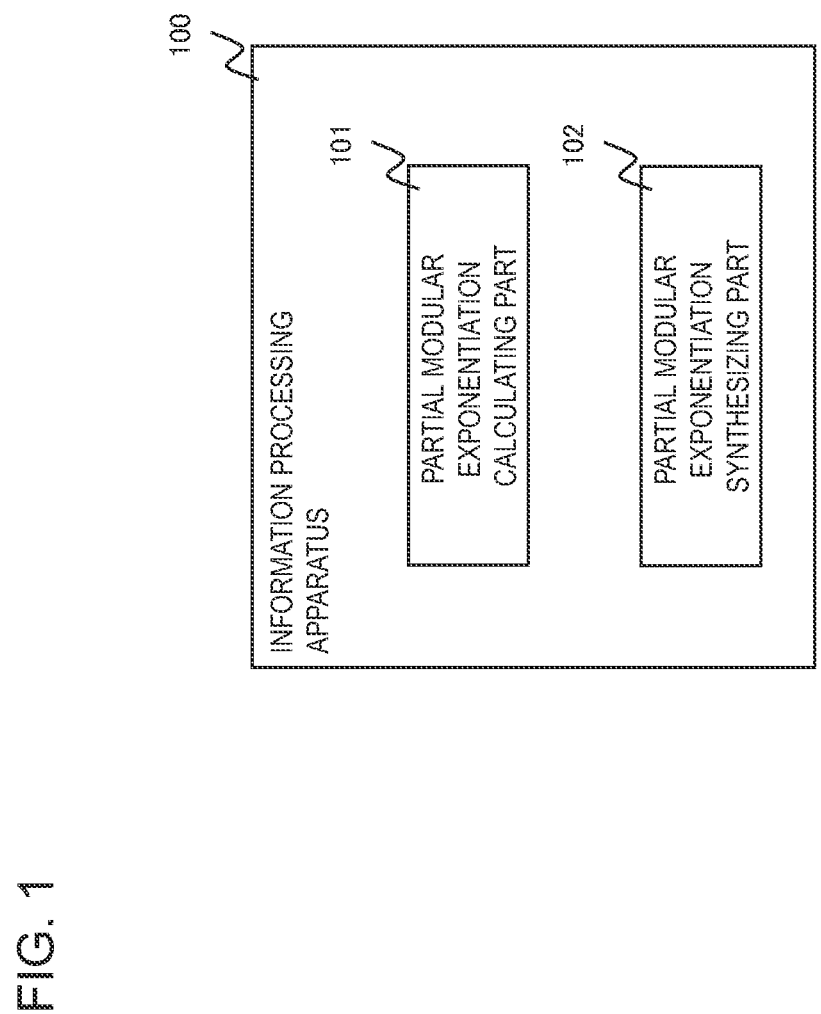
FIG. 1 is a diagram showing a configuration of an example embodiment.

First, outline of one mode of this invention will be described. Reference numbers referring to the drawings mentioned in this outline are for convenience as an example for facilitating understanding, and not intended to limit the present invention to the illustrated modes. And respective connection line(s) between blocks in each drawing appearing in the following description includes both bi-directional and single-directional. A single-directional arrow describes a main data flow schematically, which, however, does not exclude bidirectionality. Although they are omitted, there exists input port and output port at input ends and output ends in respective circuit diagrams, block diagrams, internal configuration diagrams and connection diagrams. The same applies to the input/output interface.

In one example embodiment thereof, an information processing apparatus 100 comprises a partial modular exponentiation calculating part 101 and a partial modular exponentiation synthesizing part 102 (refer to FIG. 1). The partial modular exponentiation calculating part 101 is given a base in plaintext and a modulo in plaintext and shared exponents and calculates a set of shared values according to a modular exponentiation of the shared exponents in plaintext as a partial modular exponentiation. The partial modular exponentiation synthesizing part 102 calculates shared values relating to the modular exponentiation of a sum of the shared exponents in plaintext from the partial modular exponentiation as shared values of modular exponentiation.

An information processing apparatus 100 calculates the partial modular exponentiation and calculates the shared values of a modular exponentiation from the partial modular exponentiation. Since the calculation can be performed, without communication, from the shared value of the exponent a held by respective apparatus and the input x (plaintext), the secure computation of the modular exponentiation for a given base and modulus can be efficiently performed without revealing the shared exponents obtained by (2, 3) RSS. Therefore, an information processing apparatus 100 that is efficient in terms of the amount of communication and the times of communications when calculating the modular exponentiation secure computation in a (2, 3) secret sharing scheme in three-party is provided.

First, a premised technology of this disclosure will be described.

The disclosure of this invention relates to a secure computation method using Replicated Secret Sharing comprising (2,3)-threshold scheme access structure (hereafter, termed as "(2, 3) RSS"). Hereafter, (2,3) RSS will be described.

(2, 3)-threshold RSS is one of methods to realize (2,3) secret sharing. (2, 3) secret sharing is a method of generating three shared information from an input value, in which as to the three shared information an original value can be restored by using two or more shared values but the original value cannot be restored by using one or less shared values.

The (2, 3) RSS generates a set(s) of three values (r1, r2, r3) while respective values being from zero to p−1 or less that satisfies x=r1+r2+r3 mod p upon sharing x that is a value from zero to p−1 or less. Furthermore, the (2, 3) RSS achieves (2, 3) secret sharing by using, as the three shared information, three sets of values obtained by selecting two different values from shared values (r1, r2, r3). The above p is referred to as the "modulo".

The method of performing calculation relating to shared values shared by secret sharing without recovery is called secure computation. In the following, we will explain the secure computation for the values shared by (2, 3) replicated secret sharing, which is relevant to the present disclosure. First, the method of sharing values will be described, followed by addition, subtraction, and multiplication. The three apparatuses will be referred to as apparatus 1, apparatus 2, and apparatus 3 to distinguish them.

[Sharing Method of Values]

In case of sharing w which is zero or more and less than p, p being assumed to be an integer of 2 or more, r1, r2 and r3 which are chosen randomly so as to satisfy w=r1+r2+r3 mod p are generated and stored as follows.

An apparatus 1 stores (r1, r2) as shared values of w.
An apparatus 2 stores (r2, r3) as shared values of w.
An apparatus 3 stores (r3, r1) as shared values of w.

It can be confirmed that every set lacks one of r1, r2, r3 so w cannot be obtained, but when information is available from information stored by two or more apparatuses (i.e., two or more sets of w), w can be restored.

[Addition Process]

A process of adding w and w', shared and stored by an apparatus 1, an apparatus 2 and an apparatus 3 in above-mentioned method will be described, assuming w=r1+r2+r3 mod p, and w'=r1'+r2'+r3' mod p.

The apparatus 1 stores (s1, t1)=(r1, r2) as shared values of w and stores (s1', t1')=(r1', r2') as shared values of w'.
The apparatus 2 stores (s2, t2)=(r2, r3) as shared values of w and stores (s2', t2')=(r2', r3') as shared values of w'.
The apparatus 3 stores (s3, t3)=(r3, r1) as shared values of w and stores (s3', t3')=(r3', r1') as shared values of w'.

Each apparatus performs processing according to following processes.

The apparatus 1 calculates (s1", t1") by (s1", t1")=(r1"=s1+s1' mod p, r2"=t1+t1' mod p) and stores them as the shared values of w+w'.
The apparatus 2 calculates (s2", t2") by (s2", t2")=(r2"=s2+s2' mod p, r3"=t2+t2' mod p) and stores them as the shared values of w+w'.

The apparatus 3 calculates (s3", t3") by (s3", t3")=(r3"=s3+s3' mod p, r1"=t3+t3' mod p) and stores them as the shared values of w+w'.

The respective calculated results are shared values obtained by sharing w+w' using r1", r2", r3" where w+w'=r1"+r2"+r3" mod p. This can be confirmed from r1"+r2"+r3"=(r1+r2+r3)+(r1"+r2"+r3")=w+w' mod p.

[Subtraction Process]

A process of subtracting w' from w shared and stored by apparatus 1, apparatus 2 and apparatus 3 in above mentioned method will be described, assuming w=r1+r2+r3 mod p, w'=r1'+r2'+r3' mod p.

Apparatus 1 stores (s1, t1)=(r1, r2) as shared values of w, and stores (s1', t1')=(r1', r2') as shared values of w'.
Apparatus 2 stores (s2, t2)=(r2, r3) as shared values of w, and stores (s2', t2')=(r2', r3') as shared values of w'.
Apparatus 3 stores (s3, t3)=(r3, r1) as shared values of w, and stores (s3', t3')=(r3', r1') as shared values of w'.

Each apparatus performs processing according to the following processes.

Apparatus 1 calculates (s1", t1") by (s1", t1")=(r1"=s1−s1' mod p, r2"=t1−t1' mod p) and stores it as shared values of w−w'.
Apparatus 2 calculates (s2", t2") by (s2", t2")=(r2"=s2−s2' mod p, r3"=t2−t2' mod p) and stores it as shared values of w−w'.
Apparatus 3 calculates (s3", t3") by (s3", t3")=(r1"=s3−s3' mod p, r1"=t3−t3' mod p) and stores it as shared values of w−w'.

The respective calculated results are shared values of w−w' by using r1", r2", r3" where w−w'=r1"+r2"+r3" mod p. This can be confirmed from r1"+r2"+r3"=(r1+r2+r3)−(r1'+r2'+r3')=w−w' mod p.

[Multiplication Process]

A process of multiplication of w and w' shared and stored by apparatus 1, apparatus 2 and apparatus 3 in the above mentioned method will be described.

First, it is shown what values each apparatus stores. It is assumed that r1, r2, and r3 are randomly chosen values satisfying r1+r2+r3=w mod p, and r1', r2', r3' are randomly chosen values satisfying r1'+r1'+r3' are randomly chosen values satisfying r1'+r2'+r3'=w' mod $2^n$ (n is a positive integer).

Apparatus 1 stores (s1, t1)=(r1, r2) as shared values of w, and stores (s1', t1')=(r1', r2') as shared values of w'.
Apparatus 2 stores (s2, t2)=(r2, r3) as shared values of w, and stores (s2', t2')=(r2', r3') as shared values of w'.
Apparatus 3 stores (s3, t3)=(r3, r1) as shared values of w, and stores (s3', t3')=(r3', r1') as shared values of w'.

Each apparatus follows the procedure described below.

It is assumed that as randomly chosen values satisfying r1"+r2"+r3"=0 mod $2^n$, apparatus 1 stores r1", apparatus 2 stores r2", and apparatus 3 stores r3". The r1", r2", r3" that satisfy these properties are needed as disposable each time the multiplication is performed. How the three apparatuses can efficiently generate such three values will be discussed later.

Apparatus 1 calculates u2=s1'+s1 t1'+t1 s1'+r1" mod p, and sends u1 to apparatus 2.
Apparatus 2 calculates u3=s2'+s2 t2'+t2 s2'+r2" mod p, and sends u2 to apparatus 3.
Apparatus 3 calculates u1=s3'+s3 t3'+t3 s3'+r3" mod p, and sends u3 to apparatus 1.
Apparatus 1 stores (u1, u2) as shared values of w'.
Apparatus 2 stores (u2, u3) as shared values of w'.
Apparatus 3 stores (u3, u1) as shared values of w'.

First, it can be confirmed that u1+u2+u3=r1r1'+r1r2'+r2r1'+r2r2'+r2r3'+r3r2'+r3r3'+r3r1'+r1r3'+r1"+r2"+r3"=(r1+r2+r3)(r1'+r2'+r3')+r1"+r2"+r3"=w' mod p is established.

w' mod p can be calculated in a similar way by using values stored in apparatus 1 and apparatus 2. The same applies for other combination of apparatuses. According to this method, multiplication with respect to w and w' shared by (2, 3) RSS can be performed without restoring respective value, and w' can be shared as values shared by (2, 3) RSS.

[On Randomized Number Generation]

Next, a process of generating a large number of values that become zero when three are added together, such as r1+r2+r3=0 mod $2^n$, without communicating with other apparatuses, and without subjecting values held by each apparatus to be known by other apparatuses will be described. Here a method will be explained for generating r[i, 1], r[i, 2], r[i, 3] which satisfies r[i, 1]+r[i, 2]+r[i, 3]=0 mod $2^n$ for many i=1, . . . , N.

A PRG (Pseudo Random Generator) is used as a pseudo-random number generator that outputs a sequence of n-bit numbers with a key and an index as input. The index can be a counter or the like. The method is described in the NPL 3 etc.

First, PRG keys L1, L2, and L3 are generated as a setup process of the apparatus. Assume that L1 and L3 are stored in apparatus 1, L2 and L1 are stored in apparatus 2, and L3 and L2 are stored in apparatus 3.

Each apparatus is assumed to share an index idx that is synchronized by a counter or other means. Apparatus 1 inputs key L1 and index idx to the PRG and generates n bits value r'[i] as an output. And apparatus 1 also inputs key L3 and index idx to the PRG, and generates n bits value r'[3] as divided value of PRG output per n-bits. And assume that r[1]=r'[1]−r'[3] mod p.

Apparatus 2 inputs key L2 and index idx to the PRG and generates n bits value r'[2] as the output. Apparatus 2 also inputs key L1 and index idx to the PRG, and generates n bits value r'[1] as the output. And assume that r[2]=r'[2]−r'[1] mod p.

Apparatus 3 inputs key L3 and index idx to the PRG and generates n bits value r'[3] as the output. Apparatus 3 also inputs key L2 and the index idx to the PRG, and generates n bits value r'[2] as the output. And assume that r[3]=r'[3]−r'[2] mod p.

r[1]+r[2]+r[3]=r'[1]−r'[3]+r'[2]−r'[1]+r[3] [sic. r'[3]]−r[2] [sic. r'[2]]=0 mod p, and all N pairs satisfy the condition. If it is focused on the value r[1]=r'[1]−r'[3] mod p generated by apparatus 1, it can be understood that apparatus 3 cannot obtain r'[1], and apparatus 2 cannot obtain r'[3]. This shows that apparatuses 1 and 2 are unable to calculate r[1]. This is also true for r[2] and r[3]. If the setup process has been completed, the above process can be performed before the calculation is done, etc.

In such a secure computation using (2, 3) RSS, if p=2, multiplication can be assumed to be an AND operation, and addition and subtraction can be grasped to be an Exclusive-OR operations. This makes the secure computation method suitable for logical operations when p=2. Also, if the shared information of the apparatus 1 to 3 be all (1, 1) (1, 1) (1, 1), this is distributed (shared) information of 1, as r1=1, r2=1, r3=1, in which the logical product, Exclusive-logical-OR, and constant 1 make it a complete system, and any operation can be performed.

Abovementioned methods are described in NPL 1 et al. Under this kind of method various variations may be conceived, for example, (r1−r2 mod p, r2), (r2−r3 mod p, r3), and (r3−r1 mod p, r1) may be the shared information for ($r1+r2+r3$)=w mod p. If the three apparatuses hold information corresponding to two different pairs among r1, r2, and r3, can be called as (2, 3) RSS.

Therefore, arbitral operations can be processed by using (2, 3) RSS with p=2. However, since it is inefficient to perform all operations by logical operations, it is better to perform those that can be configured by multiplication and addition/subtraction by secure computation using (2, 3) RSS with p set to a large value. $Z\_p$ (a prime number) or $2^m$ (m is an arbitral integer) is often selected as value of p, for convenience in protocol design and/or implementation aspect.

In addition, there are cases where it is preferred to combine numerical operations with logical operations. As an example, consider a case of processing a*b mod $2^4$<c where a, b, and c are smaller than $2^4$ respectively as inputs. In this case, it is preferred to process a*b as a numerical operation and perform the comparison operation as a logical operation. First, it is intended to calculate a*b as a numerical operation, however, it is difficult to express the process of comparing it with c as a numerical operation.

In order to solve these problems, a process called "bit decomposition", described in the NPL 2, is known. Bit decomposition is a converting process from shared information for numerical operations into shared information for logical operations.

Consider a case (2, 3) RSS using p=8 as modulus, where sharing is performed by using a value w=5, apparatus 1 stores (1, 2), apparatus 2 stores (2, 2) and apparatus 3 stores (2, 1). Using bit decomposition, from this information shared information for each bit of 1, 0, and 1, which is binary notation of 5, can be obtained.

Concretely, after the bit decomposition is performed, the following processing is performed:

Apparatus 1 holds (1, 1) for the first bit, (0, 1) for the second bit, (1, 0) for the third bit, and (0, 0) for the fourth bit.

Apparatus 2 holds (1, 1) for the first bit, (1, 1) for the second bit, (0, 0) for the third bit, and (0, 0) for the fourth bit.

Apparatus 3 holds (1, 1) for the first bit, (1, 0) for the second bit, (0, 0) for the third bit, and (0, 0) for the fourth bit.

As an existing technique for the bit decomposition, an overview of the method described in NPL 2 is described as follows. This method performs bit decomposition in the following steps. The numbers for which bit decomposition is to be performed are assumed to be shared by using r1, r2, and r3, where r=r1+r2+r3 mod p. In NPL 2, Mersenne prime represented as $p=2^n-1$ is used. The properties of the Mersenne primes act on the efficient calculation of s in Step 2.

Step 1: Share r12=r1+r2 mod p, r3.
Step 2: Determine whether r12+r3 is greater than p. And perform secure computation so as to result in s=1; if it is greater, and otherwise s=0.
Step 3: Perform secure computation of Full Adder with r12+r3+s mod $2^n$ from the lower significant bit for each bit.

The method described in the NPL 2 describes that the bit decomposition can be performed by 10n+4 bits of communication amount, assuming that p is an n-bit prime number.

In addition, there exists a method of bit injection, which is the inverse of bit decomposition, i.e., a method of converting shared values for logical operation into shared values for numerical operation. An overview of the method described in NPL 4 will be described as a conventional technique of bit injection.

It is assumed that the number r for which bit injection is shared by using r1, r2, and r3, which satisfy r=r1+r2+r3 mod 2.

Step 1: Apparatus 1, apparatus 2, and apparatus 3 calculate shared values of r1, r2, and r3 on modulus p from respective shared values of r held by each apparatus itself by local calculation.

Step 2: Apparatus 1, apparatus 2, and apparatus 3 calculate r1+r2+r3 from the shared values of r1, r2, and r3 to obtain shared values of r on modulus p by using addition and multiplication on modulus p.

Here, Step 1 will be operated as follows. Assume that apparatus 1 holds (r1, r2), apparatus 2 holds (r2, r3) and apparatus 3 holds (r3, r1).

Apparatus 1 uses (r1, 0) as shared value of its own r1, (0, r2) as shared values of its own r2, and (0, 0) as shared values of its own r3. Apparatus 2 uses (0, 0) as shared value of its own r1, (r2, 0) as shared values of its own r2, and (0, r3) as shared value of its own r3. Apparatus 3 uses (0, r1) as shared values of its own r1, (0, 0) as shared values of its own r2, and (r3, 0) as shared values of its own r3.

This means that r1 can be grasped as being shared by such values so as to result in: for r1 as r1=r1+0+0 mod 2, for r2 as r2=0+r2+0 mod 2, and for r3 as r3=0+0+r3 mod 2. Respective apparatus can calculate these shared values from its own shared values of r without communication. Here, r was originally the shared values on mod 2 (shared values for logical operations), however, the above calculation of the shared values of r1, r2, r3 can be regarded for r1; as r1=r1+0+0 mod p, for r2; r2=0+r2+0 mod p, and for r3; r3=0+0+r3 mod p. In other words, the shared values of r1, r2, r3 obtained by this calculation can be treated as shared values for numerical operations. Since this method allows to convert the shared values for logical operations into shared values for numerical operations, it is possible to combine secure computations for numerical operations to calculate the desired shared values.

Here, the exponent "a" is assumed as being shared a so as to result in (satisfy) a=a1+a2+a3 mod p. In the present disclosure, when performing the secure computation of $x^a$ mod p using the shared values of a certain base x and a, the shared values of $x^{(a1)}$ mod p, $x^{(a2)}$ mod p, and $x^{(a3)}$ mod p are calculated at each apparatus without communication with other apparatuses. In the following, a set of these $x^{(a1)}$ mod p, $x^{(a2)}$ mod p, and $x^{(a3)}$ mod p is denoted as partial modular exponentiation of $x^a$.

Each apparatus calculates as following. Assume that apparatus 1 holds (a1, a2), apparatus 2 holds (a2, a3), and apparatus 3 holds (a3, a1).

Apparatus 1 uses ($x^{a1}$, 0) as shared values of its own $x^{a1}$, (0, $x^{a2}$) as shared values of its own $x^{a2}$, and (0, 0) as shared values of its own $x^{a3}$. Apparatus 2 uses (0, 0) as shared values of its own $x^{a1}$, ($x^{a2}$, 0) as shared values of its own $x^{a2}$, and (0, $x^{a3}$) as shared values of its own $x^{a3}$. Apparatus 3 uses (0, $x^{a1}$) as shared values of its own $x^{a1}$, (0, 0) as shared values of its own $x^{a2}$, and ($x^{a3}$, 0) as shared values of its own $x^{a3}$.

It can be confirmed that the above calculation can be performed, without communication, from the shared values of a and x that each apparatus holds. Due to the property of exponential functions, $s=x^{a1} \, x^{a2} \, x^{a3}$ mod $p=x^{(a1+a2+}$ a3) mod p is established. Therefore, s=x^(a1+a2+a3) mod p can be calculated by two secure computations of numerical multiplication.

In the following, s=x^(a1+a2+a3) mod p which is obtained by the above calculation from the partial modular exponentiation will be denoted as a "temporal modular exponentiation".

Recalling that a=a1+a2+a3 mod p, the desired value to calculate is s'=x^a=x^(a1+a2+a3 mod p) mod p. x^(a1+a2+a3) mod p is not the same as x^(a1+a2+a3 mod p) mod p if a1+a2+a3 exceeds the modulus p. Therefore, to complete the desired modular exponentiation, after the secure computation of x^a1, x^a2, and x^a3, an additional process is performed on the temporal modular exponentiation when a1+a2+a3 exceeds the modulus p. For this process, different implementations may be taken when the modulus p is prime and when the modulus p is 2^m.

In the following, concrete example embodiment will be described in detail with reference to the drawings. Note that the same configuration element bears the same reference sign in each example embodiment, and the explanation thereof will be omitted.

First Example Embodiment

Next, a first example embodiment will be described in detail with reference to the drawings.

A partial modular exponentiation secure computation system according to the first example embodiment will be described with reference to the FIGS. 2-4.

Figure 2:
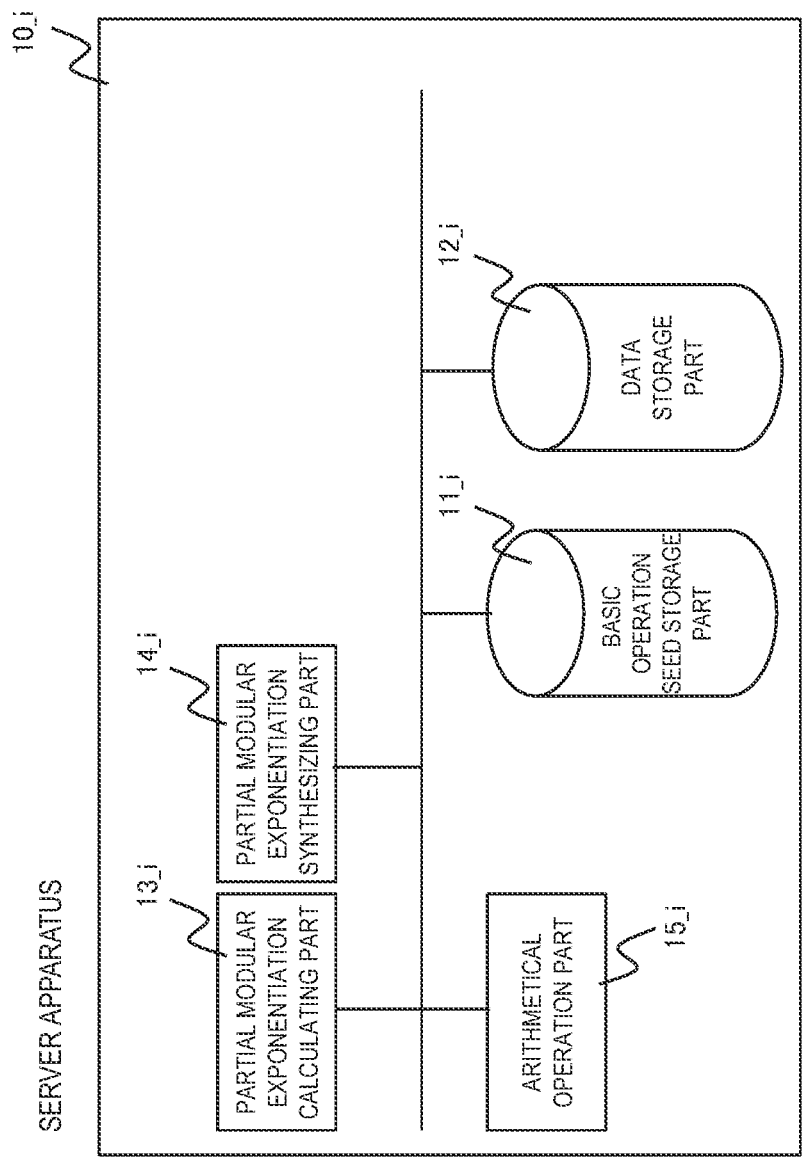
FIG. 2 is a block diagram showing an internal configuration example of a server apparatus of a first example embodiment.

FIG. 2 is a block diagram showing an example of the internal configuration (processing configuration) of the server apparatus 10 of the first embodiment. A modular exponentiation secure exponentiation system comprises a plurality of server apparatus (server apparatus of shard calculation). In the following description, individual apparatuses are identified by suffix i.

As shown in FIG. 2, the i-th server apparatuses 10_i comprises an i-th basic arithmetical seed storage part 11_i, an i-th data storage part 12_i, an i-th partial modular exponentiation calculating part 13_i, an i-th partial modular exponentiation synthesizing part 14_i, and an i-th arithmetical operation part 15_i. The i-th basic arithmetical seed storage part 11_i, the i-th data storage part 12_i, the i-th partial modular exponentiation calculating part 13_i, the i-th partial modular exponentiation synthesizing part 14_i, and the i-th arithmetical operation part 15_i are connected to each other.

A first basic operation seed storage part 11_i stores seed for generating random number to perform operation with share.

A first data storage part 12_i stores both the plaintext and the share.

A first partial modular exponentiation calculating part 13_i calculates partial modular exponentiation. Concretely, the first partial modular exponentiation calculating part 13_i is given a base in plaintext and a modulo in plaintext and shared exponents and calculates a set of shared values relating to modular exponentiation of the shared exponents in plaintext. According to above example, a set of x^(a1) mod p, x^(a2) mod p and x^(a3) mod p will be calculated as "partial modular exponentiation".

The i-th partial modular exponentiation synthesizing part 14_i calculates shared values of a modular exponentiation. Concretely, shared values according to a modular exponentiation of sum of the shared exponents in plaintext from the partial exponentiation as shared values of modular exponentiation. In the above mentioned example, s=x^(a1+a2+a3) mod p is calculated as the "shared values of modular exponentiation".

A first arithmetical operation part 15_i mainly operates multiplication in secure computation.

Figure 3:
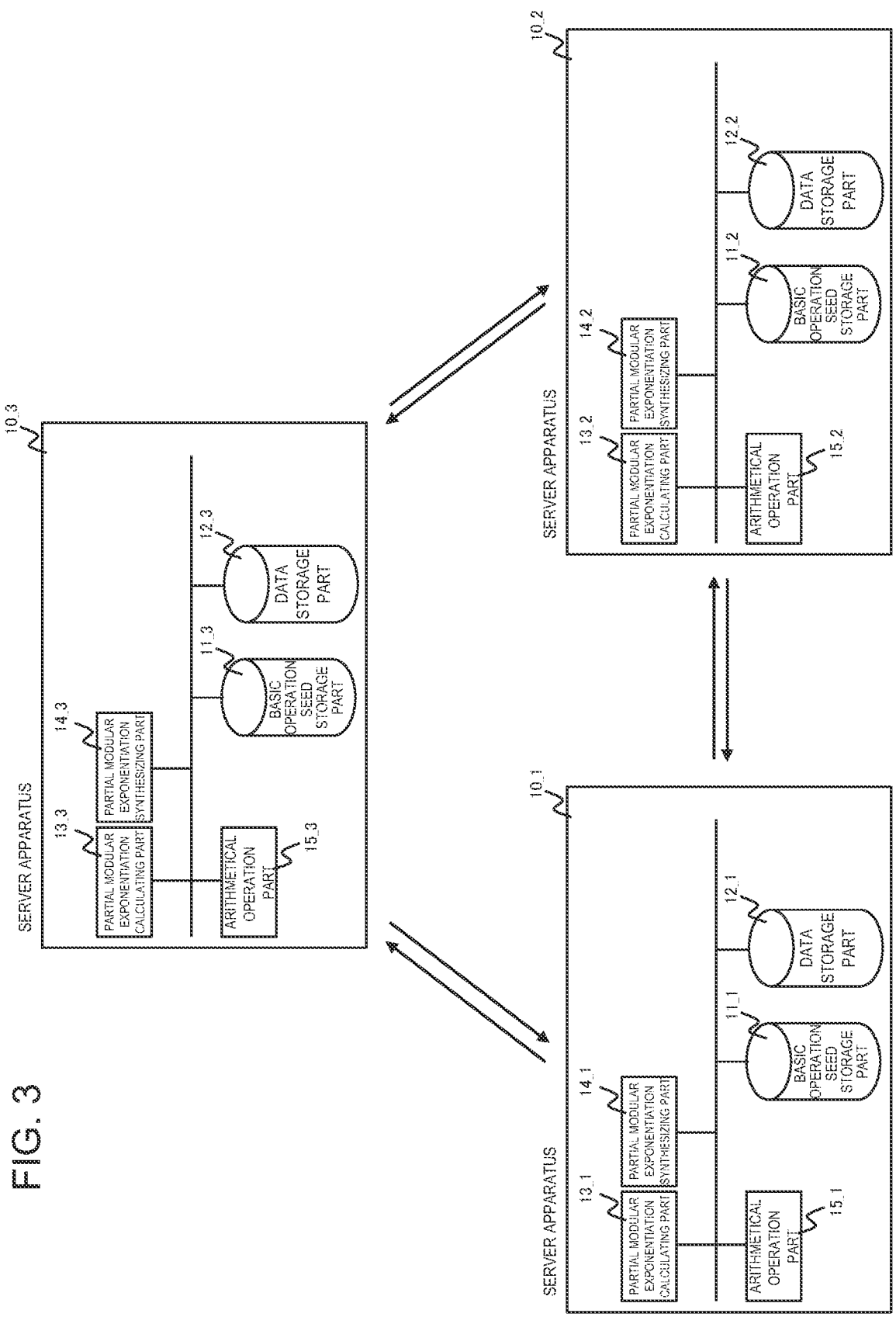
FIG. 3 is a block diagram showing a configuration example of a modular exponentiation secure computation system of the first example embodiment.

FIG. 3 is a block diagram showing an example of a modular exponentiation secure computation system according to the first example embodiment. Referring to FIG. 3, the modular exponentiation secure computation system according to the first embodiment comprises the i-th (i=1, 2, 3) server apparatuses referred to in FIG. 2. In the modular exponentiation secure computation system according to the first example embodiment, the server apparatuses 10_1, 10_2, and 10_3 are connected in a way that they can communicate with different server apparatus(es) over a network.

In the modular exponentiation secure computation of this configuration, for the shared values of x ($x \in \{0, \ldots, p-1\}$) and a by (2, 3) RSS, and modulus p, shared values of the modular exponentiation (x^a mod p) by (2, 3) RSS are calculated without being known of the value of a (exponent) from its input and the calculation process. The calculated shared values are stored in first through third data storage parts 12_1-12_3. The input x is input from any one of the first to third server apparatuses 10_1-10_3 or from outside. Exponent a is stored in the first through third data storage parts 12_1-12_3 or input from outside. The modulus p is stored in the data storage part 12. The shares of the above calculation results may be restored by sending and receiving shares to and from the first to third server apparatuses 10_1-10_3. Alternatively, the shares may be restored by sending the shares to an external party that is not the first through third server apparatuses 10_1-10_3.

Figure 4:
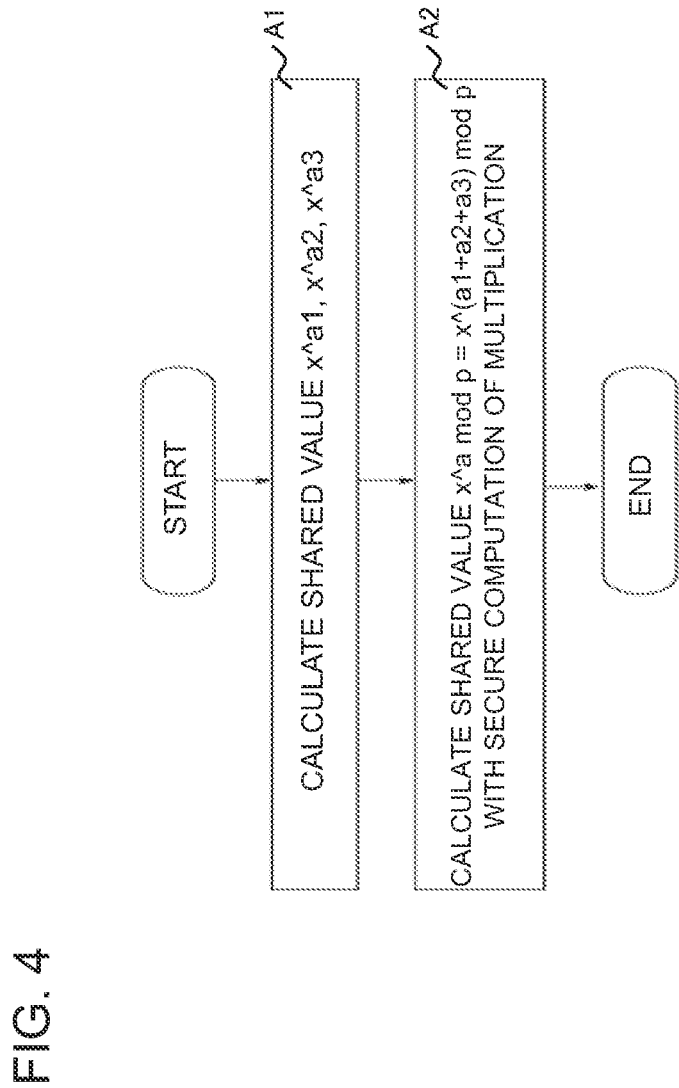
FIG. 4 is a flow chart showing an operation example of the first example embodiment.

FIG. 4 is a flow chart showing an example operation according to the first example embodiment. Referring to FIG. 4, an operation of modular exponentiation secure computation system according to the first example embodiment will be described.

Assume that data storage part 12_i stores by value p, value q, base $x \in \{0, \ldots, p-1\}$ and shared values of exponent a using (2,3) RSS by modulus q. Also assume that a of (2, 3) RSS is configured by a1, a2, and a3 which result in a=a1+a2+a3 mod q, where p, q, x satisfy the following condition (1) or (2).

(1) p, q are prime numbers, provided that modulus q is a value satisfying p>=3 q+1. In this case, x is an arbitral number which is 0 or more and p−1 or less.
(2) p=2^n where x is an odd number. q is an arbitral value which is p or less.

In step A1, each of the first to third partial modular exponentiation calculating parts 13_1-13_3 calculates shared value by using (2, 3) RSS with x^a1 mod p, x^a2 mod p, and x^a3 mod p from shared values of x and (shared values of) a stored in data storage parts 12_1-12_3 (partial modular exponentiation is calculated).

In step A2, each of the first to third partial modular exponentiation synthesizing parts 14_1-14_3 calculates shared values of s=x^a1+a2+a3 mod p from the partial modular exponentiation of step A1 by secure computation of multiplication. Here, the secure computation of multiplication is performed using the arithmetical operation parts 15_1-15_3, by using the method of NPL 3, etc. The arithmetical operation parts 15_1-15_3 communicate with each other using seeds stored in the basic operation seed storage parts 11_1-11_3.

The s obtained in step A2 becomes shared values of a desired modular exponentiation. The reason is as follows.

Under the condition of p>=3q+1, a1+a2+a3 mod q=a (mod p) is established. Also, when x is odd and p=2^n, b^{2^n}=1 (mod 2^n) is valid based on Euler's theorem, so if a=a1+a2+a3 mod 2^n and a'=a1+a2+a3, then s=x^(a') mod 2^n=n^a·x^-{k·k2^n} mod 2^n=x^a mod 2^n.

Finally, each server apparatus 10_*i* (i=1, 2, 3) stores shared values of x^a mod p obtained in step A2 to data storage part 12_*i*. Instead of storing at data storage part 12_*i*, the sharing values may be transmitted to an external server which is different from the server apparatuses 10_1, 10_2, 10_3 to restore the shared values.

As abovementioned, in the first mode of example embodiment of this invention, partial modular exponentiation is calculated and the shared values of modular exponentiation is calculated from the partial modular exponentiation.

Second Example Embodiment

Next, a second example embodiment will be described in detail with reference to the drawings.

A partial modular exponentiation secure computation system according to the second example embodiment will be described with reference to the FIGS. 5-7.

Figure 5:
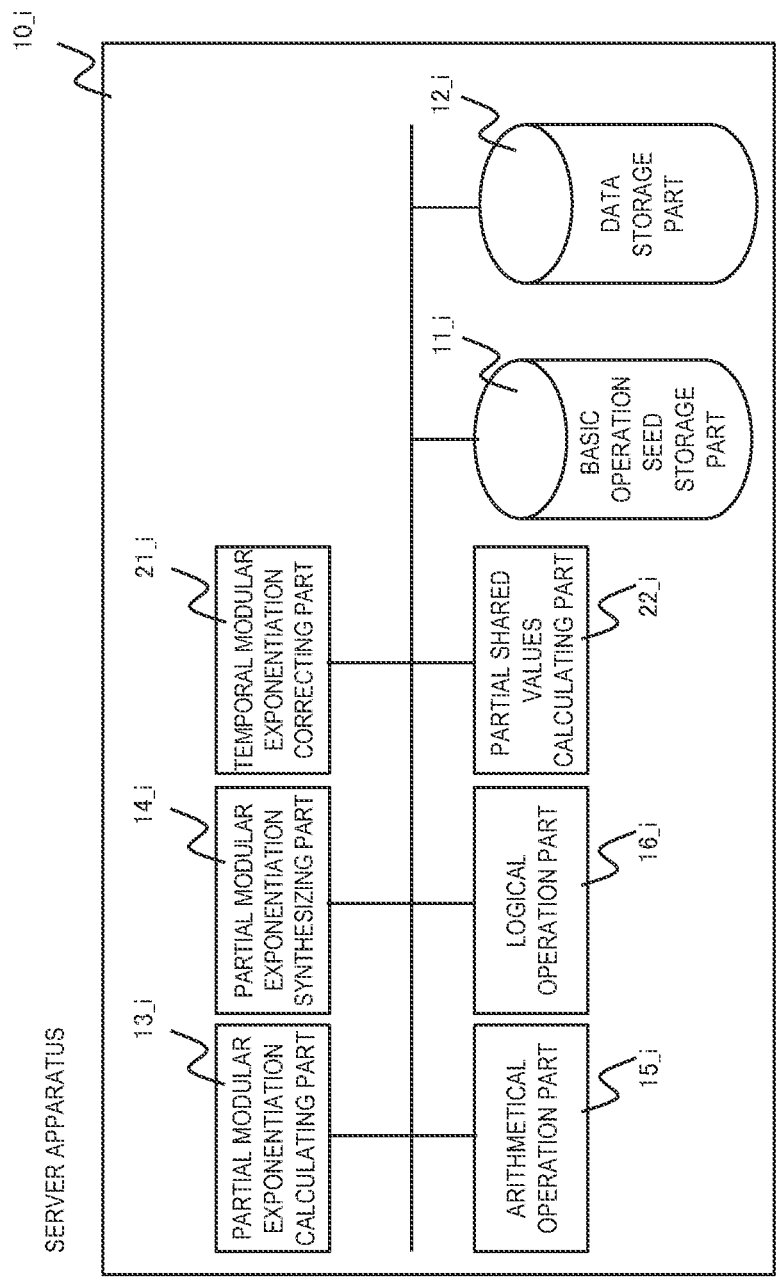
FIG. 5 is a block diagram showing an internal configuration example of a server apparatus of a second example embodiment.

FIG. 5 is a block diagram showing an example of the internal configuration (processing configuration) of the server apparatus 10 of the second example embodiment. As shown in FIG. 5, the i-th server apparatus 10_*i* includes the i-th basic arithmetical seed storage part 11_*i*, the i-th data storage part 12_*i*, the i-th partial modular exponentiation calculating part 13_*i*, the i-th partial modular exponentiation synthesizing part 14_*i*, an i-th temporal modular exponentiation correcting part 21_*i*, the i-th arithmetical operation part 15_*i*, an i-th logical operation part 16_*i*, and the i-th partial shared values calculating part 22_*i*. The i-th basic arithmetical seed storage part 11_*i*, the i-th data storage part 12_*i*, the i-th partial modular exponentiation calculating part 13_*i*, the i-th partial modular exponentiation synthesizing part 14_*i*, the i-th temporal modular exponentiation correcting part 21_*i*, the i-th arithmetical operation part 15_*i*, the i-th logical operation part 16_*i*, and the i-th partial shared values calculating part 2_*i* are connected to each other.

In FIG. 2 and FIG. 5, identical configuration elements are marked with the same sign(s), and the descriptions are omitted. Comparing FIG. 5 to FIG. 2, the i-th logical operation part 16_*i*, the i-th temporal modular exponentiation correcting part 21_*i*, and the i-th partial shared values calculating part 22_*i* are added. In addition, handling of the results calculated by the i-th partial modular exponentiation synthesizing part 14_*i* is different between the first and the second example embodiments.

The i-th partial modular exponentiation synthesizing part 14_*i* calculates shared values according to the modular exponentiation of sum of the shared-exponents in plaintext from the partial modular exponentiation as "shared values of temporal modular exponentiation".

The i-th logical operation part 16_*i* calculates shared values of at least the lowest significant bit of shared values in plaintext by secure computation. A concrete process of the i-th logical operation part 16_*i* will be described later.

The i-th temporal modular exponentiation correcting part 21_*i* calculates shared values of modular exponentiation from the shared values of the temporal modular exponentiation. Concretely, the i-th temporal modular exponentiation correcting part 21_*i* calculates shared values of modular exponentiation through correction to the shared values of the temporal modular exponentiation.

The i-th partial shared values calculating part 22_*i* calculates shared values of a1, shared values of a2 and shared values of a3 on the modulus p from shared values of a.

Figure 6:
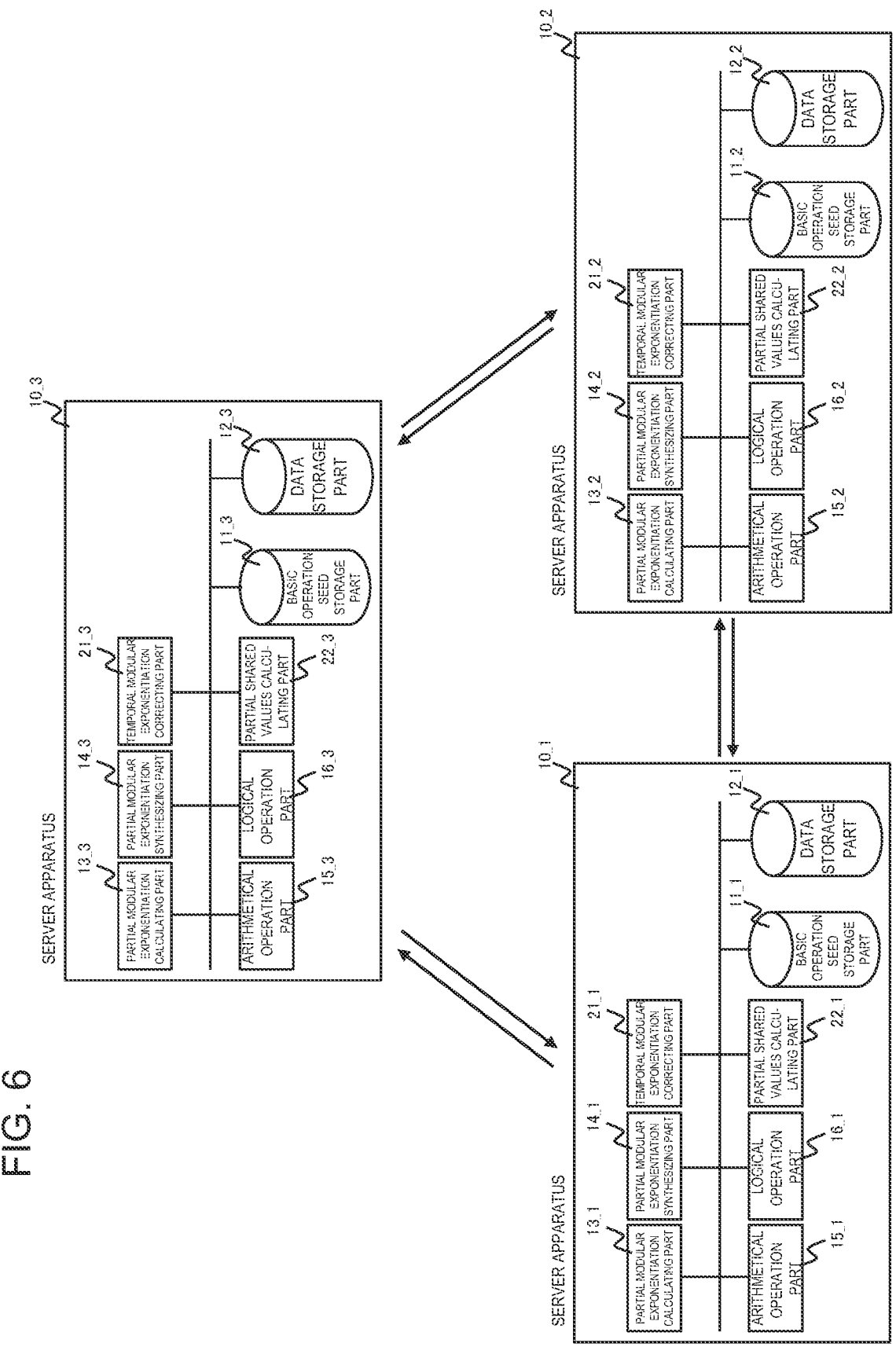
FIG. 6 is a block diagram showing a configuration example of a modular exponentiation secure computation system of the second example embodiment.

FIG. 6 is a block diagram showing a configuration example of the modular exponentiation secure computation system according to the second example embodiment. Referring to FIG. 6, the modular exponentiation secure computation system according to the second example embodiment comprises from i-th (i=1, 2, 3) server apparatus(es) referring to FIG. 5. In modular exponentiation secure computation system according to the second example embodiment, server apparatus(es) 10_1, 10_2, and 10_3 is connected with a server apparatus other than the own one by a communicatable way via a network(s).

In the modular exponentiation secure computation of this configuration, for the shared values of x (x∈{0, . . . , p−1}) and a by (2, 3) RSS, and modulus p, shared values of the modular exponentiation (x^a mod p) by (2, 3) RSS are calculated without being known of the value of a (exponent) from its input and the calculation process. The shared values are stored in the first through third data storage parts 12_1-12_3. The input x is input from any of the first to third server apparatuses 10_1-10_3 or from outside. Exponent a is stored in the first through third data storage parts 12_1-12_3 or input from outside. The modulus p is stored in the data storage part 12. The shares of the above calculation results may be restored by sending and receiving shares to and from the first to third server apparatuses 10_1-10_3. Alternatively, the shares may be restored by sending the shares to an external party that is not the first through third server apparatuses 10_1-10_3.

Figure 7:
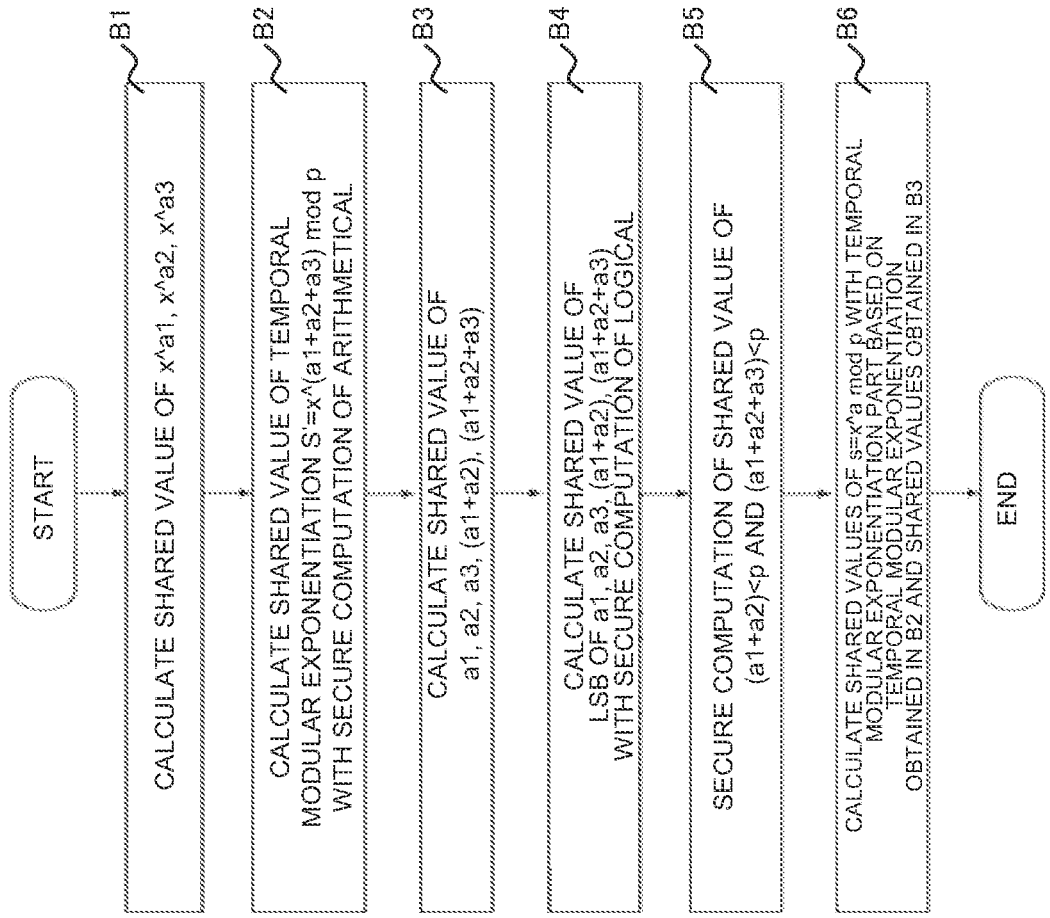
FIG. 7 is a flow chart showing an operation example of the second example embodiment.

FIG. 7 is a flowchart showing an operation example according to the second example embodiment. Referring to FIG. 7, an operation of the modular exponentiation secure computation system according to the second example embodiment will be described.

It is assumed that the data storage 12_*i* stores the values p, q and the base x∈{0, . . . , p−1}, the modulus q and the shared values of the exponent a shared by the modulus q using (2, 3) RSS. It is also assumed that the (2, 3) RSS of a is composed of a1, a2, and a3, where a=a1+a2+a3 mod q. However, p and q are prime numbers, and any one of the conditions (1') 3q+1>p>=2q+1, or (2') 2q+1>p is to be satisfied.

In step B1, the first to third partial modular exponentiation calculating parts 13_1-13_3 calculate the shared values of x^a1 mod p, x^a2 mod p, and x^a3 mod p by (2, 3) RSS from the shared values of x and a stored in the data storages 12_1-12_3, respectively.

In step B2, the first to third partial modular exponentiation synthesizing parts 14_1-14_3 calculate shared values of s'=x^(a1+a2+a3) mod p from the partial modular exponentiation obtained in step B1 using secure computation of multiplication. Here, the secure computation of multiplication is performed by arithmetical operation parts 15_1-15_3 using the method of NPL 3. Arithmetical operation parts 15_1-15_3 communicate each other using seeds stored in basic operation seed store parts 11_1-11_3.

The s' obtained at step B2 is termed as temporal modular exponentiation.

In step B3, the first to third partial shared values calculating parts 22_1-22_3 calculate shared values of a1, shared values of a2, and shared values of a3 on the modulus p from the shared values of a stored in the data storage parts 12_1-12_3, respectively. The shared values of a1+a2 and a1+a2+a3 are also calculated using the arithmetical operation part 15. These processes can be performed by each of server apparatuses 10_1-10_3 without recourse to communication.

In step B4, first to third logical operation parts 16_1-16_3 calculate shared values of the lowest significant bit of a1, a2, a3, (a1+a2), (a1+a2+a3) using secure computation. The notation of respective lowest significant bit is termed as LSB(a1), LSB(a2)), LSB(a3), LSB(a1+a2 mod p), and LSB (a1+a2+a3 mod p). These processes are performable using for example secure computation of bit decomposition described in NPL 2 etc.

In step B5, the first to third logical operation parts 16_1-16_3 calculate the shared values of truth values of logic formulas (a1+a2)>p and (a1+a2+a3)>p from the shared values of LSB (a1), LSB (a2), LSB (a3), LSB (a1+a2 mod p), and LSB (a1+a2+a3 mod p) obtained in step B4 by secure computation. (a1+a2+a3)>p from the shared values of the logical formulas (a1+a2)>p and (a1+a2+a3) >p. Provided is that each logical formula is assumed to be "1" when the condition is true, and "0" when it is false.

When p is an odd number and a1+a2>p, the parity of a1+a2 and a1+a2 mod p is reversed. Focusing on this fact, this process is (a1+a2>p)=LSB(a1)+LSB(a2)+LSB(a1+a2) mod 2, and can be performed without communication by secure computation of addition in logical operations. Similarly, (a1+a2+a3>p)=LSB (a1+a2)+LSB (a3)+LSB (a1+a2+ a3) mod 2 can be calculated. In the case where p and q satisfy the aforementioned condition (1') 3q+1>p>=2q+1, calculation of (a1+a2>p) can be omitted because a1+a2 is smaller than p (a1+a2>p=0 without fail).

In step B6, the first through third temporal modular exponentiation correcting parts 21_1-21_3 calculate shared values of a desired modular exponentiation s=x^a mod p from the shared values s' of the temporal modular exponentiation calculated in step B2 and the shared values of (a1+a2>p) and (a1+a2+a3>p) calculated in step B5.

The above calculation can be done, for example, by the following procedure.

(B6-1) Secure computation of s'·(a1+a2>p)·b^{-1}+s'·(1- (a1+a2>p)) is calculated by the arithmetical operation parts 15_1-15_3. The shared values obtained by this calculation are used as the shared values of t.

(B6-2) Secure computation of t·(a1+a2+a3>p)+t·(1-(a1+ a2+a3>p)) is performed by the arithmetical operation parts 15_1-15_3. The shared values obtained in this Step (B6-2) become shared values of a modular exponentiation x^a mod p that is desired.

As described above, in the second example embodiment, the shared values of the modular exponentiation are calculated by modifying (correcting) the shared values of the temporal modular exponentiation using shared values such as (a1+a2>p) and (a1+a2+a3>p). As a result, as in the first example embodiment, the secure computation of the modular exponentiation for a given base and modulus can be efficiently performed without revealing the values of the exponents shared by (2, 3) RSS.

[Hardware Configuration]

Figure 8:
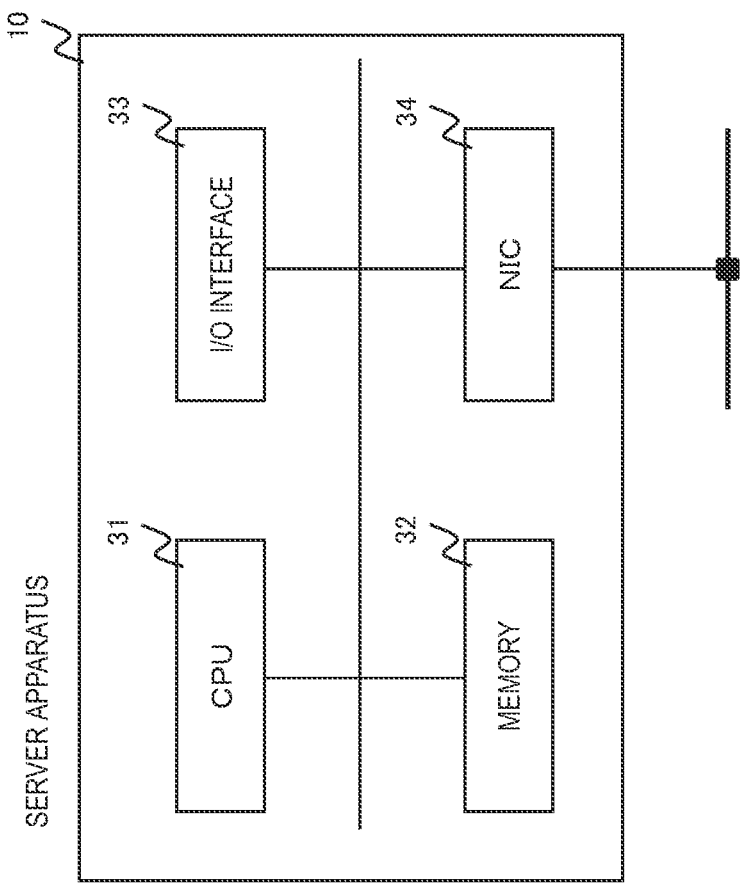
FIG. 8 is a block diagram showing a hardware structure example of a server apparatus 10.

Next, a hardware configuration of a server apparatus 10 for the first and second embodiments will be described. FIG. 8 is a block diagram showing an example of the hardware configuration of the server apparatus 10.

The server apparatus 10 can be configured by an information processing device (computer) and has a configuration illustrated in FIG. 8. For example, the server apparatus 10 is equipped with a CPU (Central Processing Unit) 31, a memory 32, an I/O interface 33, and a NIC (Network Interface Card) 34, which are connected to each other by an internal bus.

However, the configuration shown in FIG. 8 is not intended to limit the hardware configuration of the server apparatus 10. The server apparatus 10 may comprise hardware not shown in the figure, and may not comprise an input/output interface 33 upon needs. The number of CPUs, etc. included in the server apparatus 10 is also not intended to be limited to the example shown in FIG. 8; for example, a plurality of CPUs may be included in the server apparatus 10.

Memory 32 is a RAM (Random Access memory), ROM (Read Only Memory) or auxiliary storage device (for example, hard disk or the like).

Input Output Interface 33 is an undepicted display device or interface media of input device. Display device is, for example, LCD Display or the like. Input device is a device that accepts user operation such as keyboard, mouse, or the like.

The functions of server apparatus 10 is realized with any processing module(s) abovementioned. The processing module can be realized by CPU 31 performing a program stored in memory 32. And, the program can be downloaded over a network or updated by using a storage medium storing the program. Further, the above processing module can be realized by a semiconductor chip. That is, there may be means configured to execute the functions performed by the above processing modules in any hardware and/or software.

From the above description, the industrial applicability of the invention is clear. It makes possible to compute digital signatures while protecting the secret key, and is suitably applicable to the protection of secret keys on shared nodes such as blockchains. Modular exponentiation is a function that is frequently used in cryptographic processing, and if the modular exponentiation can be performed in secure computation, cryptographic processing can be efficiently realized in a shared system(s).

It is to be noted that each of the disclosures in the abovementioned non-patent literatures is incorporated herein by reference. Modifications and adjustments of example embodiments and examples are possible within the bounds of the entire disclosure (including the claims) of the present invention, and also based on fundamental technological concept(s) thereof. Furthermore, a wide variety of combinations and selections (including partial deletions) of various disclosed elements is possible within the scope of the claims of the present invention. That is, the present invention clearly includes every type of transformation and modification that a person skilled in the art can realize according to the entire disclosure including the claims and to technological concept(s) thereof. In particular, with respect to the numerical ranges described in the present application, any numerical values or small ranges included in the ranges should be interpreted as being specifically described even if not otherwise explicitly recited.

REFERENCE SIGNS LIST

10_i, 10_1-10_3, 10 Server apparatus
11_i, 11_1-11_3 Basic operation seed storage part
12_i, 12_1-12_3 Data storage part
13_i, 13_1-13_3, 101 Partial modular exponentiation calculating part
14_i, 14_1-14_3, 102 Partial modular exponentiation synthesizing part 15_i, 15_1-15_3 Arithmetical operation part
16_i, 16_1-16_3 Logical operation part
21_i, 21_1-21_3 Temporal modular exponentiation correcting part
22_i, 22_1-22_3 Partial shared values calculating part
31 CPU (Central Processing Unit)
32 Memory
33 Input/Output Interface
34 NIC (Network Interface Card)
100 Information processing apparatus

What is claimed is:

1. A secure computing apparatus comprising:
a processor;
a memory storing instructions executable by the processor to:
calculate, given a base in plaintext and a modulo in plaintext and shared exponents, a partial modular exponentiation that equals a set of shared values relating to modular exponentiation of the based raised by the shared exponents;
calculate shared values of a temporal modular exponentiation from the partial modular exponentiation that equal shared values relating to shared modular exponentiation of a sum of the shared exponents; and
calculate shared values of the modular exponentiation from the shared values of the temporal modular exponentiation.

2. The secure computing apparatus according to claim 1, wherein the instructions are executable by the processor to further perform a secure computing with multiplication,
wherein the shared values of the modular exponentiation are calculated using the secure computing with multiplication.

3. The secure computing apparatus according to claim 1, wherein the instructions are executable by the processor to further store, in a data storage, seeds for generating random numbers upon performing one or more operations on shares.

4. The secure computing apparatus according to claim 1, wherein the instructions are executable by the processor to further store, in a data storage, plaintexts and shares.

5. The secure computing apparatus according to claim 1, wherein the instructions are executable by the processor to further calculate at least shared values of a lowest bit of the shared exponents using secure computing.

6. The secure computing apparatus according to claim 1, wherein the shared values of the modular exponentiation are calculated in secure computing using a duplicated secure sharing scheme comprising a (2,3)-threshold scheme access structure.

7. A secure computing method comprising:
calculating, by a processor, a partial modular exponentiation that equals, given a base in plaintext and a modulo in plaintext and shared exponents, a set of shared values relating to modular exponentiation of the base raised by the shared exponents;
calculating, by the processor, shared values of a temporal modular exponentiation from the partial modular exponentiation that equal shared values relating to shared modular exponentiation of a sum of the shared exponents; and
calculating, by the processor, shared values of the modular exponentiation from the shared values of the temporal modular exponentiation.

8. The secure computing method according to claim 7, wherein the shared values of the modular exponentiation are calculated by using a secure computing with multiplication.

9. The secure computing method according to claim 7, wherein seeds for generating random numbers upon performing one or more operations on shares are stored in a data storage.

10. The secure computing method according to claim 7, wherein plaintexts and shares are stored in a data storage.

11. The secure computing method according to claim 7, further comprising:
calculating, by the processor, at least shared values of a lowest bit of the shared exponents using secure computing.

12. The secure computing method according to claim 7, wherein the shared values of the modular exponentiation are calculated in secure computing using a duplicated secure sharing scheme comprising a (2,3)-threshold scheme access structure.

13. A non-transitory computer readable medium storing a program executable by a computer to perform:
calculate, given a base in plaintext and a modulo in plaintext and shared exponents, a partial modular exponentiation that equals a set of shared values relating to modular exponentiation of the base raised by the shared exponents;
calculate shared values of a temporal modular exponentiation from the partial modular exponentiation that equal shared values relating to shared modular exponentiation of a sum of the shared exponents; and
calculate shared values of the modular exponentiation from the shared values of the temporal modular exponentiation.

14. The non-transitory computer readable medium according to claim 13, wherein the shared values of the modular exponentiation are calculated by using a secure computing with multiplication.

15. The non-transitory computer readable medium according to claim 13, wherein seeds for generating random numbers upon performing one or more operations on shares are stored in a data storage.

16. The non-transitory computer readable medium according to claim 13, wherein the program is executable by the computer to further perform:
calculate at least shared values of a lowest bit of the shared exponents using secure computing.

17. The non-transitory computer readable medium according to claim 13, wherein the shared values of the modular exponentiation are calculated in secure computing using a duplicated secure sharing scheme comprising a (2,3)-threshold scheme access structure.

* * * * *